Figure 1:
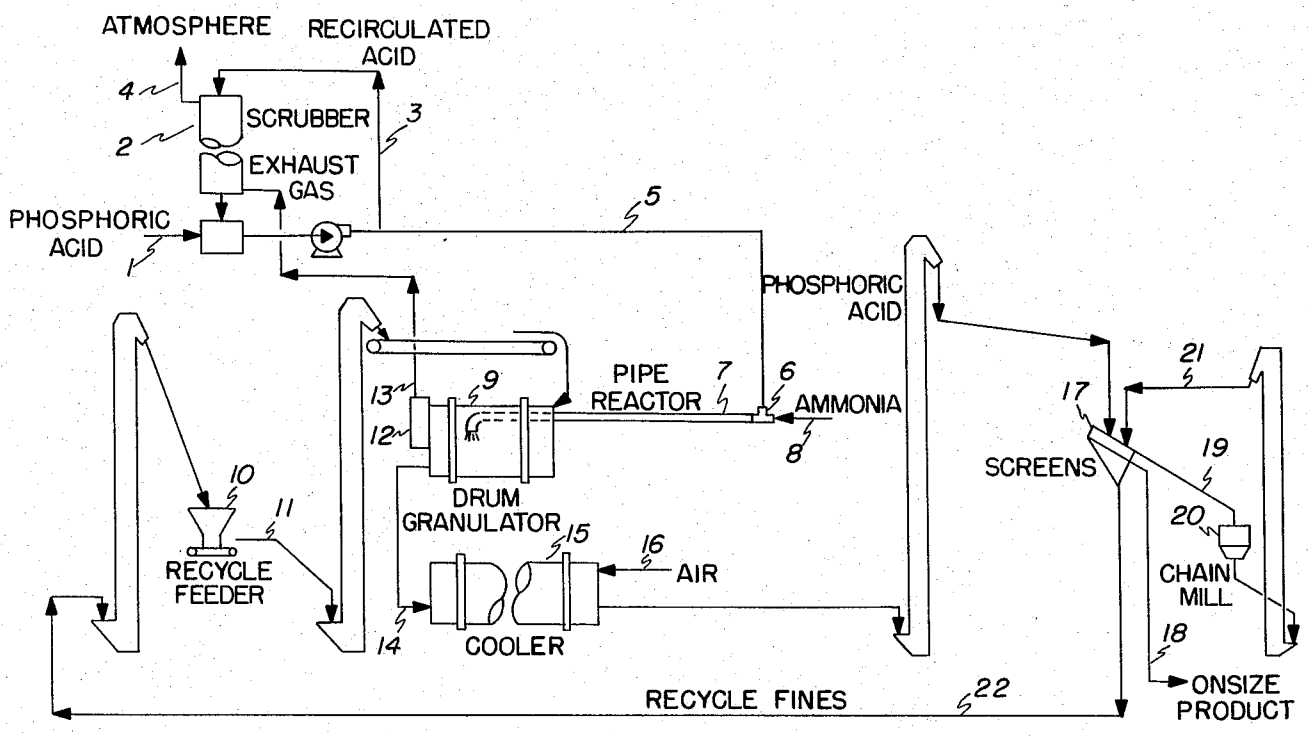
Figure 2:
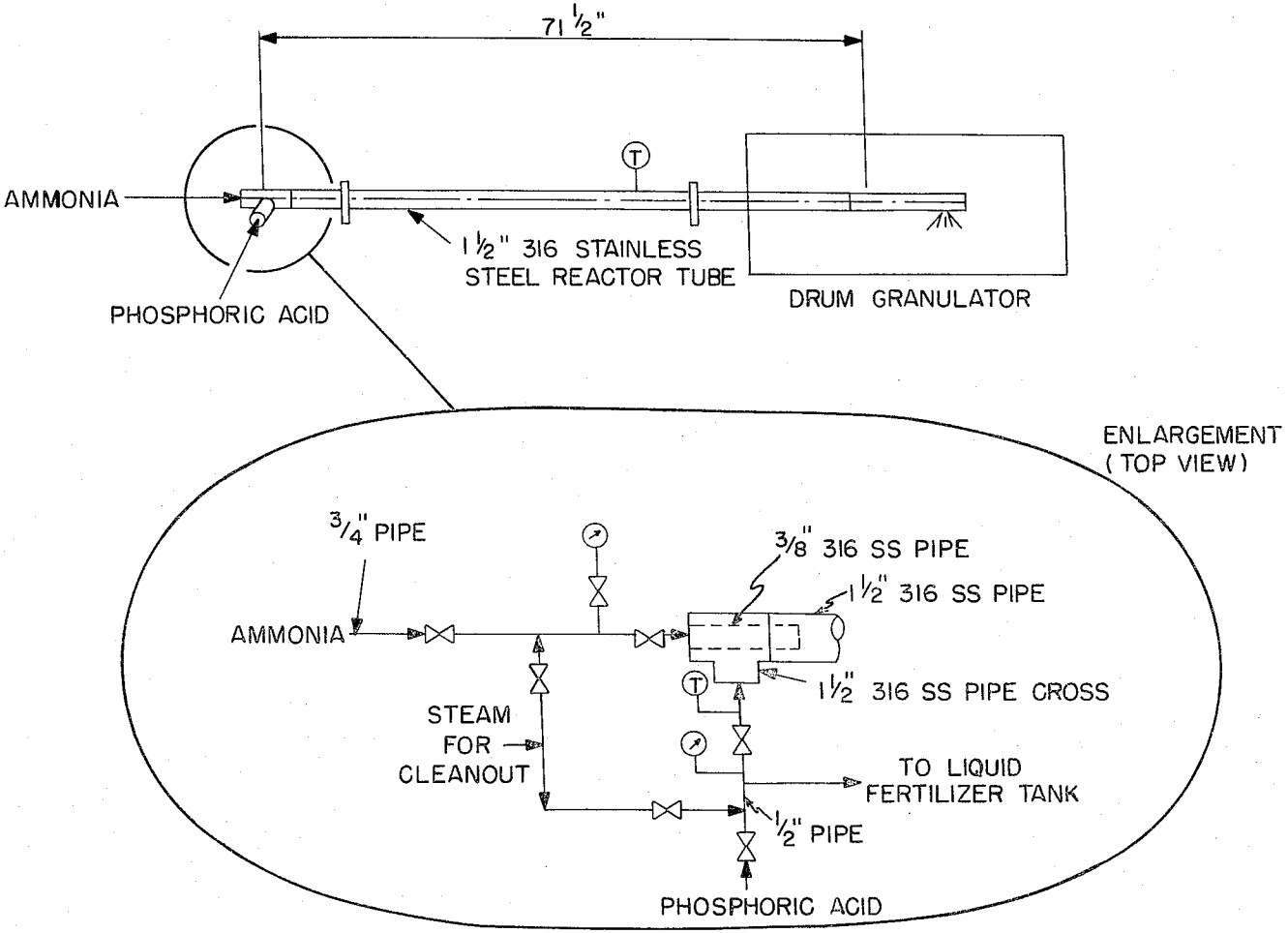
Figure 3:
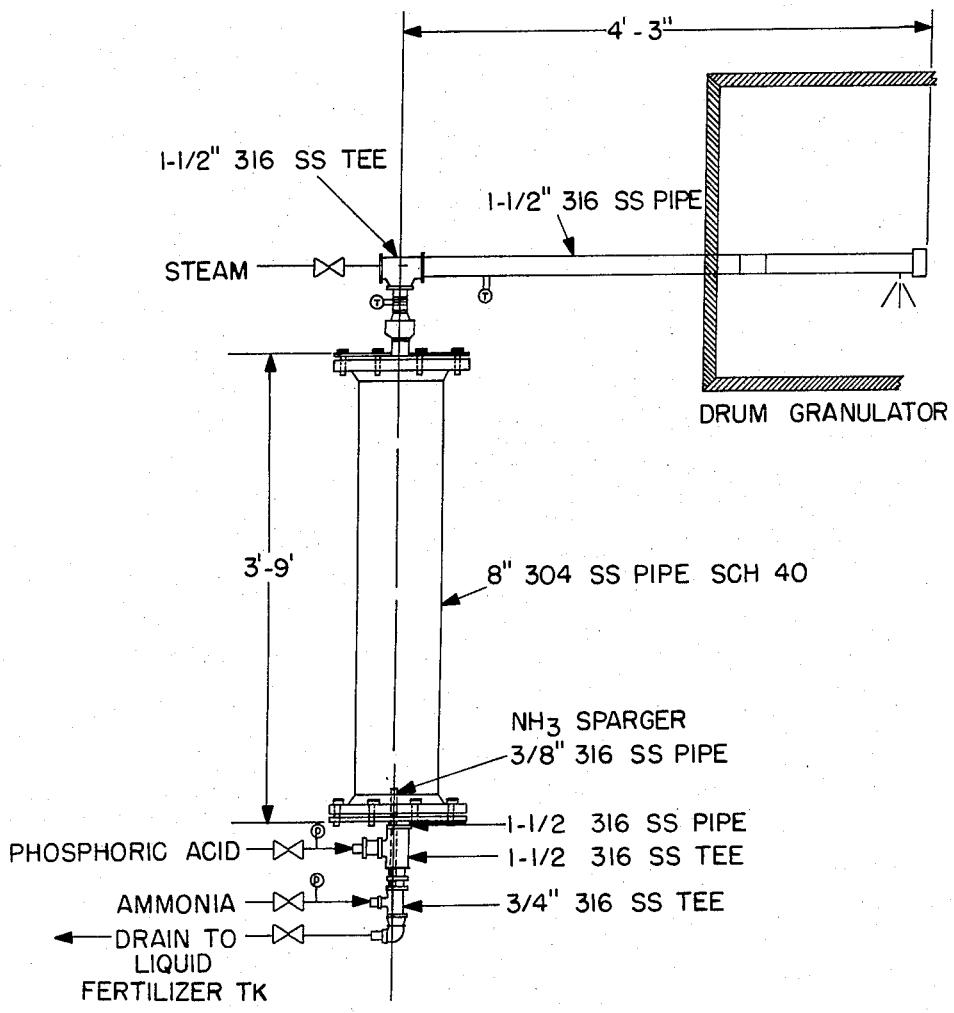
Figure 4:
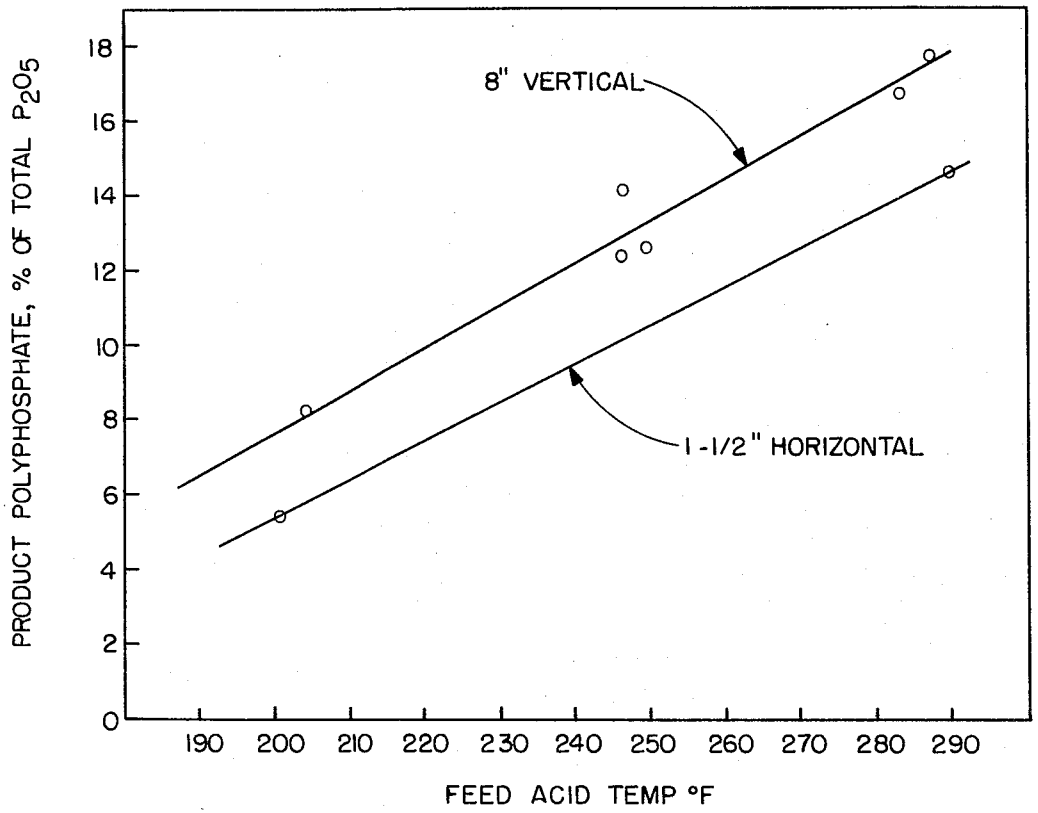
Figure 5:
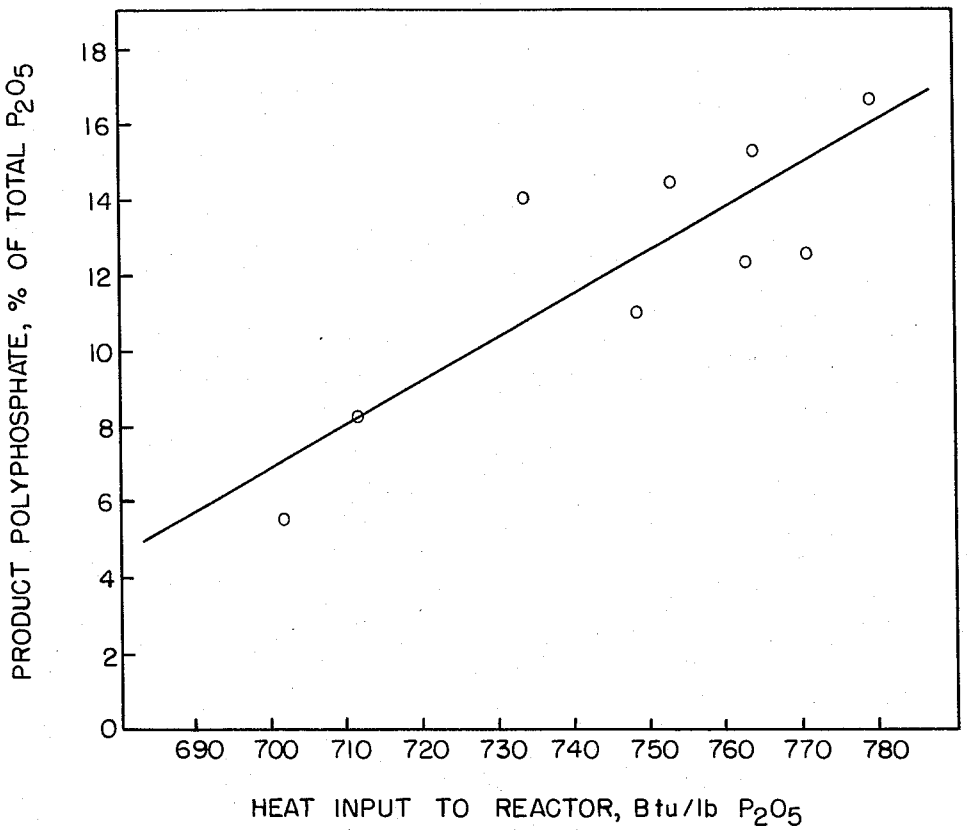
Figure 6:
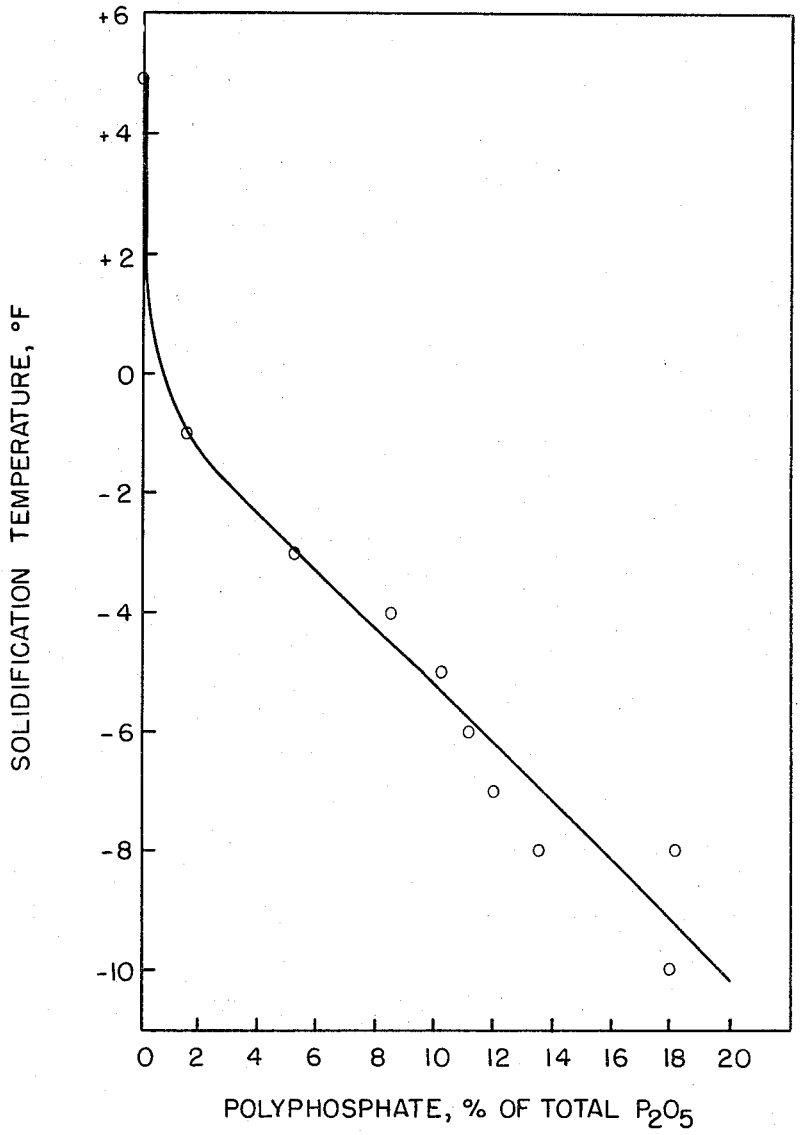

United States Defensive Publication [19] (H) [11] T102,601

Parker et al. [43] Jan. 4, 1983

[54] PRODUCTION OF GRANULAR AMMONIUM-POLYPHOSPHATE WITH AN INLINE REACTOR AND DRUM GRANULATOR

[76] Inventors: Byron R. Parker, Rte. 7, Box 117; Thomas R. Stumpe, Rte. 7, Box 487, both of Florence, Ala. 35630

[21] Appl. No.: 358,396

[22] Filed: Mar. 15, 1982

[51] Int. Cl.[3] ..... C05B 7/00

[52] U.S. Cl. ..... 71/34; 71/44; 423/310; 423/312

[57] ABSTRACT

Method for production of granular ammonium polyphosphate fertilizer in which ammonium polyphosphate melt is prepared in a simple inline reactor and distributed onto a bed of solids in a drum granulator to bind smaller fertilizer particles into granules. The desired polyphosphate content can be obtained in the granular product by adjusting the total heat input of the feed reactants to the reactor by means of energy conservation modifications to the system. Energy losses from the reaction system are controlled by use of a predetermined quantity of insulation so that varying amounts of the maximum theoretical heat input can be utilized to produce products of polyphosphate contents as desired. The quantities of insulation and the resulting heat inputs to the reactor have been identified which will produce the given critical polyphosphate content material, determined to be 12 percent of total phosphate as polyphosphate in a granular material, which will give 10 percent polyphosphate in a suspension fertilizer made from the granular material. No external heat is required and energy savings can be readily realized as well as production cost savings.

3 Claims, 6 Sheets Drawing,

23 Pages Specification

The file of this unexamined application may be inspected and copies thereof may be purchased (849 O.G. 1221, Apr. 9, 1968).

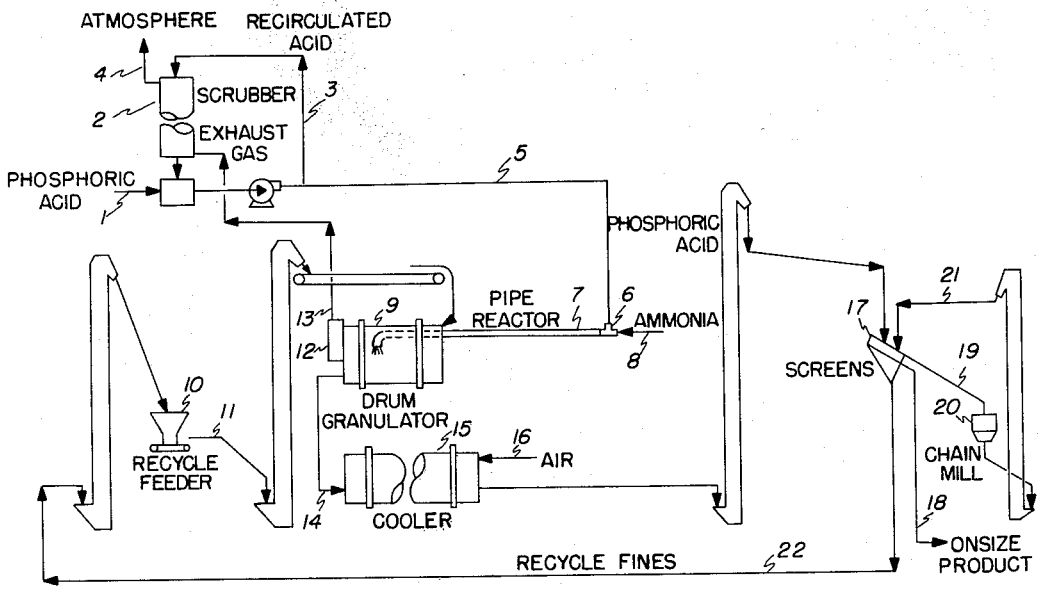

FLOW DIAGRAM OF GRANULATION PILOT-PLANT FOR PRODUCTION OF AMMONIUM POLYPHOSPHATE USING THE PIPE REACTOR

FLOW DIAGRAM OF GRANULATION PILOT-PLANT FOR PRODUCTION OF AMMONIUM POLYPHOSPHATE USING THE PIPE REACTOR

CONFIGURATION OF PILOT-PLANT PIPE REACTOR

CONFIGURATION OF PILOT PLANT PIPE REACTOR
USING AN 8-INCH REACTION TUBE

EFFECT OF FEED ACID TEMPERATURE ON PRODUCT POLYPHOSPHATE CONTENT

EFFECT OF HEAT INPUT TO THE PIPE REACTOR ON PRODUCT POLYPHOSPHATE CONTENT

POLYPHOSPHATE SUSPENSION OF NOMINAL 11-33-0 GRADE